United States Patent
Vande Ryse et al.

[11] Patent Number: 5,855,109
[45] Date of Patent: Jan. 5, 1999

[54] APPARATUS FOR MAKING ROUND BALES

[75] Inventors: Johan Adolf Eric Vande Ryse, Brugge; Cyriel Richard Jozef De Busscher, Sijsele; Danny Noël Oscar Claeys, Oedelem; Dirk André René Vandamme, Blankenberge, all of Belgium

[73] Assignee: New Holland North America, Inc., New Holland, Pa.

[21] Appl. No.: 853,006

[22] Filed: May 8, 1997

[30] Foreign Application Priority Data

May 14, 1996 [GB] United Kingdom .................. 9610007

[51] Int. Cl.⁶ ......................... A01F 15/00; A01D 39/00
[52] U.S. Cl. ............................... 56/341; 100/88
[58] Field of Search .................. 56/341, 343; 100/88

[56] References Cited

U.S. PATENT DOCUMENTS

| 4,330,985 | 5/1982 | Shindelar | 56/341 |
| 4,550,556 | 11/1985 | Meiners | 56/341 |
| 4,635,543 | 1/1987 | Clostermeyer et al. | 56/341 |
| 4,955,188 | 9/1990 | Von Allworden | 56/341 |
| 4,956,968 | 9/1990 | Underhill | 56/341 |
| 5,044,272 | 9/1991 | Jennings | 56/341 |
| 5,224,328 | 7/1993 | Viaud | 56/341 |
| 5,255,501 | 10/1993 | McWilliams | 56/341 |

FOREIGN PATENT DOCUMENTS

| 2419456 | 11/1974 | Germany | 56/341 |
| 2001231 | 6/1978 | United Kingdom . | |

*Primary Examiner*—Terry Lee Melius
*Assistant Examiner*—Arpad Fabian Kovacs
*Attorney, Agent, or Firm*—J. William Stader; Larry W. Miller; Frank A. Seemar

[57] ABSTRACT

A round baler comprising a baling chamber mounted on a main frame for forming cylindrical packages of crop material therein, the baling chamber being at least partially defined by a pair of side walls and an apron assembly having an inner run which is guided at the inside of a cylindrically shaped continuous wall, and an outer run which is guided at the outside of said continuous wall. The continuous wall is provided with an opening for the recuperation into the chamber of crop material which has been entrained by the apron assembly when the latter left the baling chamber and entered its outer run.

5 Claims, 6 Drawing Sheets

APPARATUS FOR MAKING ROUND BALES

BACKGROUND OF INVENTION

1. Field of Art

This invention relates generally to an apparatus for making cylindrical bales, commonly referred to as a round baler. More particularly, this invention pertains to a baler of the type having a fixed bale forming chamber which is at least partially defined by a conveyor which is guided along a continuous cylindrical wall.

2. Description of Art

Prior art balers generally have a bale forming chamber defined by an apron comprising an array of side-by-side belts, transverse slats trained on chains, a plurality of rolls or a combination of these various elements, e.g. rolls and belts. Crop material such as hay or straw is picked up from the ground as the baler traverses the field, fed into a fixed or variable chamber where it is accumulated and compressed to form a cylindrical package of crop material. The formed package, while in its compacted condition inside the chamber, is wrapped with net, plastic film, twine or the like, to produce a completed round bale which is then ejected from the chamber onto the ground for subsequent handling.

A baler having a fixed chamber, that is, a bale forming chamber that does not vary in size, is disclosed in UK Patent Application GB 2,001,231 A. The chamber is defined by a pair of floor rolls and a cylindrical wall along which the inner run of a conveyor is guided. This conveyor comprises a pair of opposing chains between which a plurality of slats is mounted for engaging and rotating the crop material fed into the bale forming chamber. The conveyor leaves the chamber at its front end near the crop inlet and runs upwardly and rearwardly along the outside of the bale chamber wall to the back of the baler from where it is guided downwardly to enter again into the chamber in the vicinity of the floor rolls.

A portion of the crop material fed into the bale chamber may become trapped between the slats of the conveyor and the cylindrical wall and may be pulled out of the chamber by these slats. Some material may fall back on the windrow in front of the pick-up unit and be recuperated by the same, but the rest is carried by the outer run of the conveyor along the upper surface of the bale chamber until it reaches the rear portion of the baler from where it falls onto the field and is lost.

SUMMARY OF THE INVENTION

It is an object of the present invention to reduce these losses of crop material and to provide means which, on the one hand reduces the chance that crop material remains trapped between the slats and the inner wall of the bale chamber, and on the other hand assist in recovering material which has been drawn out of baling chamber by these slats.

According to the invention, there is provided a baler for forming crop material into cylindrical bales, said baler comprising a main frame and a baling chamber mounted on said main frame for forming cylindrical packages of crop material within.

The baling chamber is partially defined by a pair of side walls and an apron assembly having an inner run which is guided at the inside of a cylindrically shaped continuous wall. The apron assembly also has an outer run which is guided at the outside of said continuous wall.

The baler is characterized in that the continuous wall is provided with an opening for the recuperation into said chamber of crop material which has been entrained by said apron assembly when the latter left said baling chamber and entered its outer run.

This recuperation opening preferably extends over the full width of the baling chamber and may have a circumferential length which is substantially equal to the distance between two consequent slats of the apron assembly. The opening according to the invention may advantageously be used in fixed chamber baler wherein the inner and outer runs of the apron assembly are guided along the inside and the outside of the cylindrical wall.

BRIEF DESCRIPTION OF THE DRAWINGS

The invention will now be described in greater detail, with reference to the accompanying drawings in which.

DETAILED DESCRIPTION OF THE INVENTION

Figure 1:
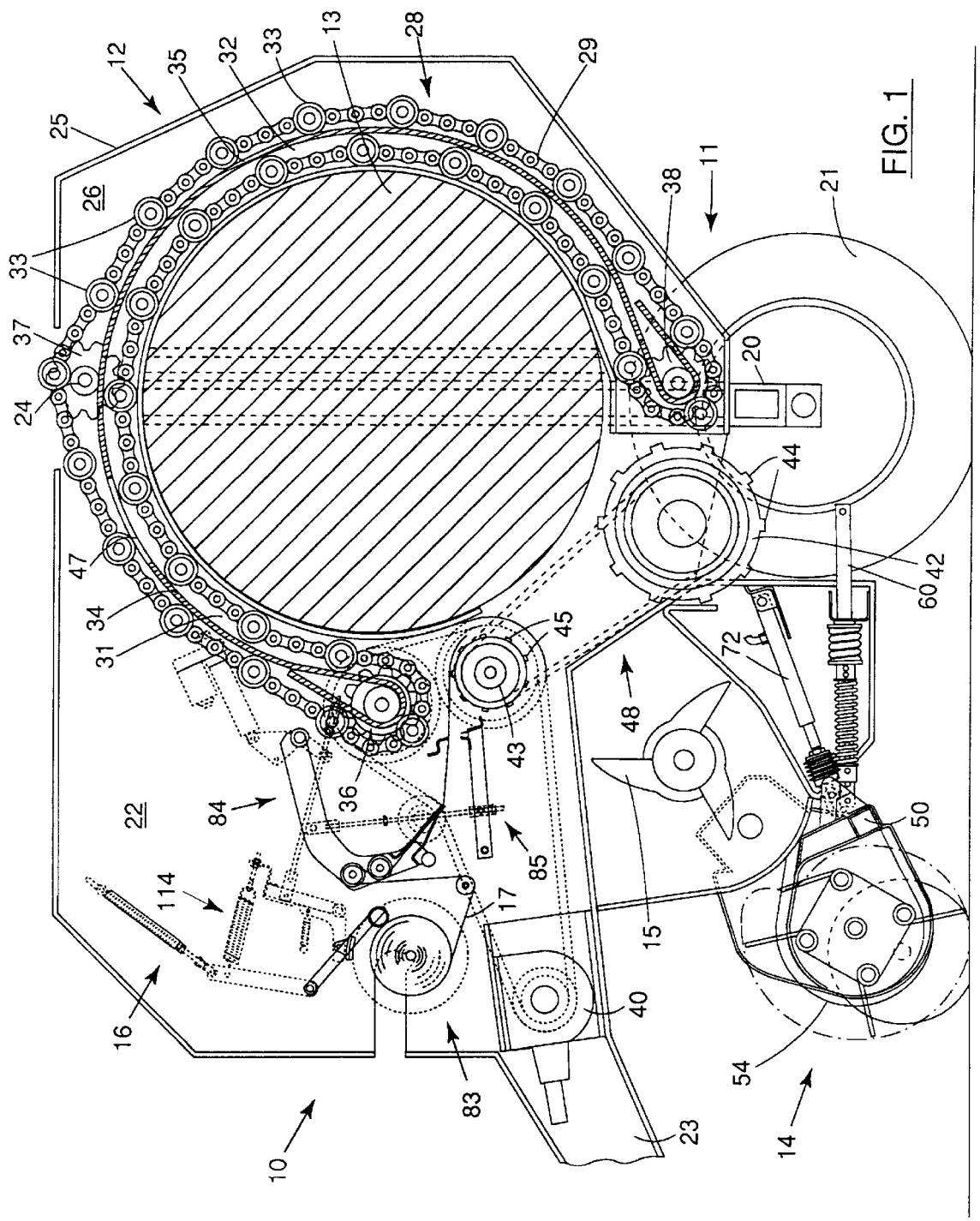
FIG. 1 is a cutaway side elevational view of a round baler, comprising a main frame, a pick-up assembly, a baling chamber with an apron conveyor and a wrapping apparatus.

Referring now to the drawings for a more detailed description of the inventions, FIG. 1 shows a round baler 10, including a main frame 11, a fixed bale forming chamber 12 mounted onto this frame 11 for forming a cylindrical package of crop material 13 therein, a pick-up assembly 14 for picking up crop material, such as hay or straw, from the field and delivering it to a rotatable conveyor 15 which feeds it into the bale forming chamber 12 while the baler 10 is moved across the field, and a wrapping apparatus 16 for wrapping material such as plastic sheet or net 17 around a completed cylindrical package 13 within the bale forming chamber 12.

The main frame 11 includes a main support beam 20 on which a pair of wheels 21 (only one shown) is rotatably affixed. The frame 11 further includes a pair of side walls 22 (only one shown) between which the bale forming chamber 12 extends.

The baler 10 also includes a tongue 23 extending from the forward portion of the main frame 11 for conventional connection to a tractor. Pivotally connected to the side walls of the main frame 11 by a pair of stub shafts 24 is a tailgate 25, which may be closed during bale formation, as shown in FIG. 1, or pivoted open about stub shafts 24 to discharge a completed bale. The tailgate 25 includes tailgate walls 26 coextensive with the side walls 22.

The bale forming chamber 12 is defined primarily by an apron assembly 28 comprising a pair of support chains 29 mounted to travel along a continuous path, the inner run of which is defined on side walls 22 and tailgate walls 26 by front and rear sections 31, 32 of a continuous chain guide track that separates during bale discharge. The apron assembly 28 further comprises a plurality of parallel tubular crop-engaging slats 33 extending between the chains 29 to provide a cage-like periphery of the cylindrically shaped chamber 12. Radially outwardly of the inner run of apron assembly 28 are front and rear sections 34, 35 of a continuous cylindrical bale chamber wall. These wall sections 34, 35, also separable during bale discharge, are mounted between the side walls 22 and the tailgate walls 26, respectively, for maintaining integrity between the outer and inner runs of the apron assembly 28 and for preventing losses of brittle and short stalks of crop material, which might otherwise fall from between the slats 33 onto the field.

Operatively engaged with the chains 29 are drive sprockets 36 mounted between the side walls 22, idler sprockets 37 also mounted between the side walls 22 on the stub shafts 24, and idler sprockets 38 mounted between tailgate walls 26. A conventional chain drive system for the drive sprockets 36 is provided via appropriate coupling to a gearbox 40 in a conventional matter, depicted in phantom outline outwardly of side wall 22.

The bale forming chamber 12 is further defined by the outer conveying surfaces of a floor roll 42 and a stripper roll 43, both of which are driven in a clock-wise direction as seen in FIG. 1, by conventional drive means appropriately coupled to gearbox 40. These rolls 42, 43 are provided with ribs 44, 45 to enhance their ability to convey crops in the chamber 12 as a bale is being formed. Other forms of aggressive structure may be used to accommodate various types of crops and conditions.

In the top portion of the front wall section 34, there is provided a rectangular opening 47 extending over almost the full width of the bale forming chamber 12 and having a length in the circumferential direction which is substantially equal to the distance between to consequent conveyor slats 33.

During operation crop material is picked up from the field by the pick-up assembly 14 and delivered to the rotary conveyor 15 which in turn delivers the material to the bale chamber inlet 48, which is defined between the floor roll 42 and the stripper roll 43. Within the bale forming chamber 12 the incoming material is engaged and rotated by the slats 33 of the apron assembly 28. A portion of the crop stalks extends in between the slats 33 and may get caught between these slats 33 and the bale chamber wall 34, 35. The slats 33 convey these stalks along the inside of the wall and may eventually pull them out of the bale forming chamber 12, when the slats leave this chamber at the lower end of the front wall section 34. The ribs 45 of the stripper roll 43 do not penetrate between the slats 33 and hence cannot engage the crop material which is trapped between the slats 33 and the front wall section 34.

However a substantial portion of the crop material which was trapped between the apron assembly 28 and the rear wall section 35 will never reach the front portion of the bale forming chamber 12: when the slats 33 pass along the rectangular opening 47, the trapped material is no longer pressed against an inner wall and is released such that it can fall back into the bale forming chamber 12, where it can be incorporated into the cylindrical package 13. This recuperation is particularly effective as long the bale forming chamber 12 is not completely filled and the top portion thereof is containing no or only fluffy crop material.

The trapped crop stalks which nevertheless reaches the exit of the apron assembly 28 above the stripper roll 43, are conveyed by the slats 33 out of the bale forming chamber 12 and along the outside of the front wall section 34. When this material reaches the rectangular opening 47 it is released and falls back into the chamber 12, where it is incorporated into the cylindrical package 13. In prior art balers having a continuous chamber wall without recuperation opening, the trapped material would have been conveyed over the top of the front and rear wall sections 34, 35 and deposited rearwardly of the baler 10, such that it would be lost for further bale formation.

While the preferred structure in which the principles of the present invention have been incorporated, is shown and described above, it is to be understood that the invention is not to be limited to the particular details, as shown and described above, but that, in fact, widely different means may be employed in the practice of the broader aspects of the invention.

For example, it is conceivable to provide a recuperation opening in another part of the front or rear wall section 34, 35 of the bale forming chamber 12. The single opening 47 may equally be replaced with a plurality of transversely arranged openings in the upper portion of one of the wall sections 34, 35.

It will be appreciated that, according to the invention, means are provided for, on the one hand, reducing the chance that crop material remains trapped between the slats of an apron conveyor and a continuous inner wall of a bale chamber, and on the other hand, assisting in recovering material which has been drawn out of the baling chamber by these slats.

Figure 2:
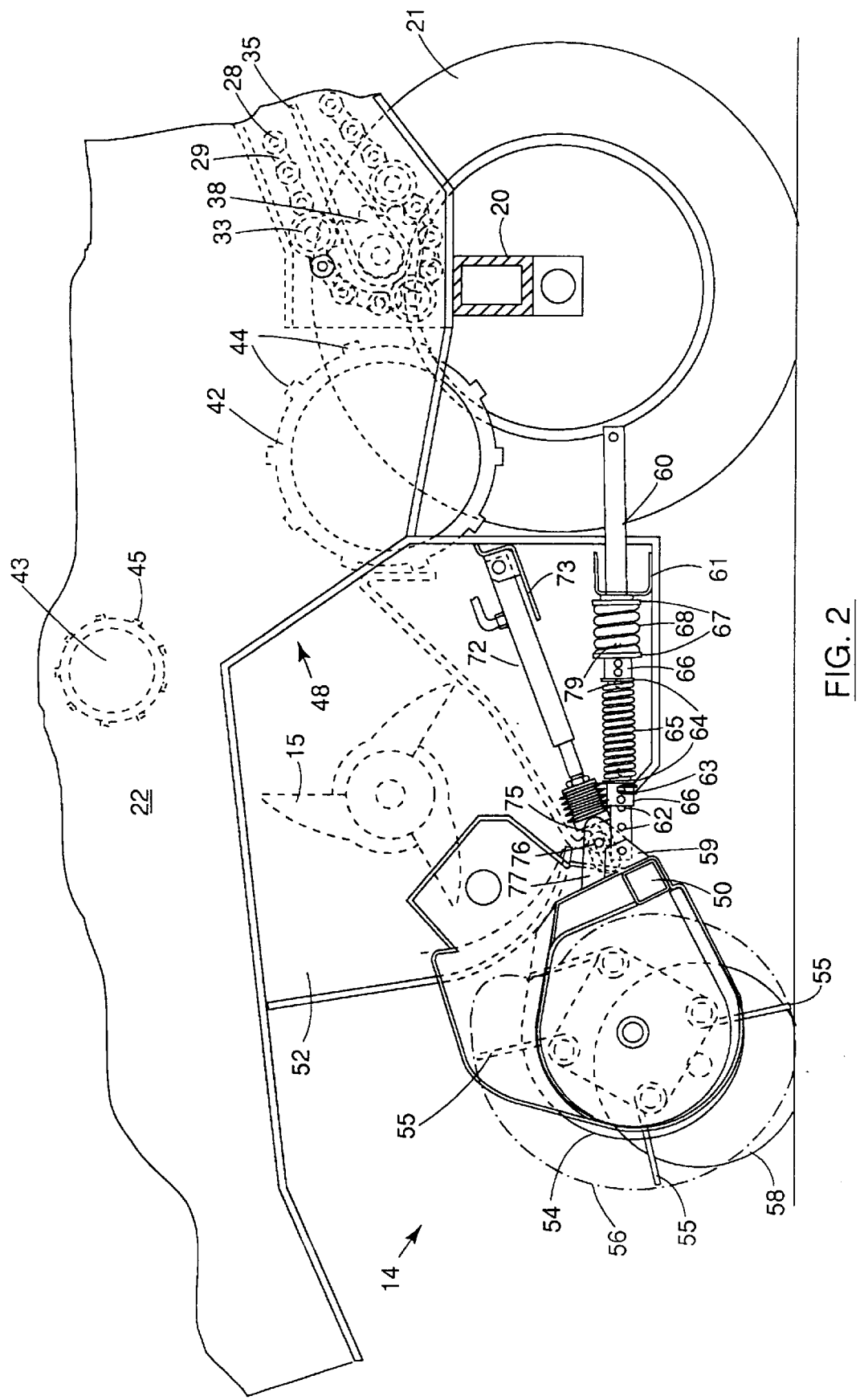
FIGS. 2 and 3 are enlarged side elevational views of the area between the pick-up assembly and the main frame of the baler of FIG. 1, showing the pick-up assembly in two distinct working positions.
Figure 3:
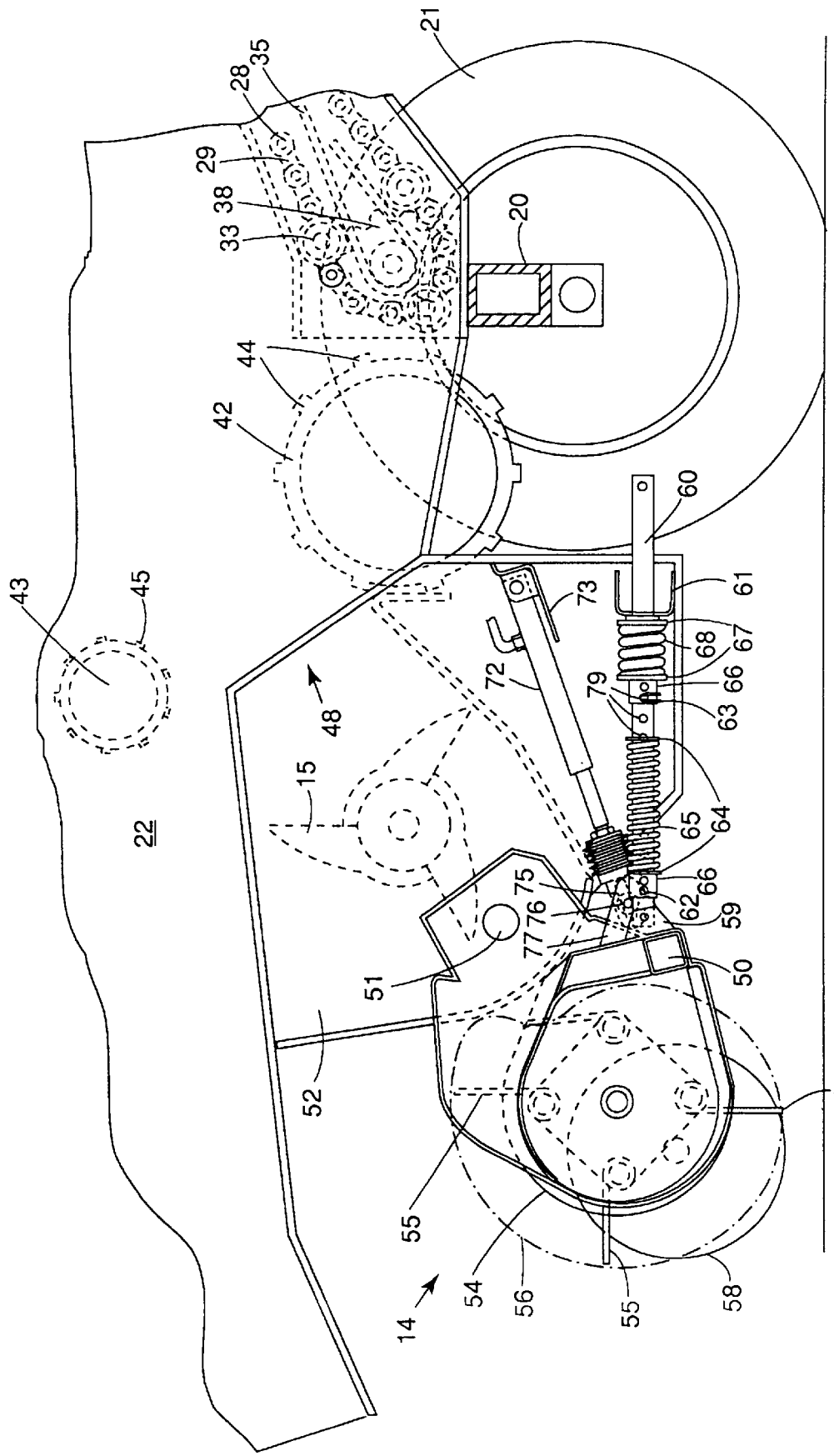

As shown in FIGS. 1, 2 and 3, the pick-up assembly 14 comprises a pick-up frame 50 which is mounted for pivotment about a transverse pivot axis 51 to and between two side wall extensions 52 (only one shown) which are extending downwardly from both side walls 22. These extensions 52 equally hold the shaft of the rotary conveyor 15 and constitute the side walls of a duct registering with the inlet 48 of the bale forming chamber 12.

The pick-up 14 assembly further comprises a set of side-by-side arranged guide plates 54 which are affixed to the pick-up frame 50. In a conventional manner four sets of pick-up tines 55 are travelled through the spacings between the guide plates 54 along a path 56, illustrated in phantom in FIGS. 2 and 3. Ground-engaging guide members, such as guide wheels 58, are rotatably mounted to the sides of the pick-up frame 50 for limiting the clearance between the lower side of the guide members and the ground surface.

A bracket 59 is welded to the rear portion of the pick-up frame 50 for holding therein the front end of a tubular positioning bar 60. The rear portion of this bar 60 is held for sliding movement in an opening of a transverse beam 61 which is welded to one of the side wall extensions 52. The front portion of the positioning bar 60 is provided with a plurality of mounting holes 62 for a clevis pin 63. A flotation spring 65 is mounted between a pair of washers 64 over the positioning bar 60. The front washer 64 is rested against a collar 66 mounted over the bar 60 and secured thereto by the pin 63, while the rear washer 64 is held against an identical collar 66 which is slideably mounted on the positioning bar 60. A cushioning spring 68 is mounted between two other washers 67 between the rear collar 66 and the transverse beam 61. The spring constant of this cushioning spring 68 is much greater than the spring constant of the flotation spring 65, such that a load on the front end of the latter will primarily cause the compression of this spring 65, while the length of the cushioning spring will not vary substantially.

FIG. 2 shows the pick-up assembly 14 in a floating condition, i.e. the full weight of this assembly 14 is not supported by the guide wheels 58, but the larger portion thereof is supported by the springs 65, 68. When the baler 10 is travelled over the field, the wheels 58 follow the ground contour and move the pick-up frame 50 upwardly and downwardly to adjust the path 56 of the pick-up tines 55 to the actual ground level. The position bar 60 slides back and forth through the opening in the beam 51, while the flotation spring 65 extends and contracts between the front collar 66, secured by the clevis pin 63, and the substantially stationary intermediate collar 66.

The front collar 66 may be slid over the bar 60 and secured thereto by mounting the clevis pin 63 in another of the holes 62 for adapting the pick-up position to the hitch height of distinct tractors or for varying the compression of the flotation spring 65 and hence the portion of the weight of the pick-up assembly 14 which is compensated by this spring 65.

The pick-up frame 50 can be pivoted upwardly and downwardly by means of a single-acting hydraulic actuator 72, whereof the cylinder is pivotably connected to a support 73 which is welded above the beam 61 to side wall extension 52. The piston end carries a slotted extension 75 through which extends a pin 76 which is affixed to a support 77 welded to the back of the pick-up frame 50. During baling operations the actuator 72 is retracted or extended to make the centre of the pin 76 coincide with the middle of the slot in the extension 75. When the pick-up assembly 14 is oscillated while travelling over the field, the flotation spring 65 may expand and retract accordingly. This movement is not hampered by the fixed position of the hydraulic actuator 72 as the pin 76 is permitted to travel back and forth within the limits of the slot of the actuator extension 75. In case the field conditions change and the pin 76 continuously engages the one or other slot end, such that free movement of the pick-up frame 50 is limited, freedom of movement can be restored by adjusting the extension of the hydraulic actuator 72.

When the operator wishes to adjust the portion of the pick-up weight which is transferred upon the guide wheels 58, he can use the hydraulic actuator 72 to raise the pick-up frame 50 and pull the positioning bar 60 forwardly. The flotation spring 65 and the cushioning spring 68 are released and the load on the clevis pin 63 is relieved. Now the springs 65, 68 and the intermediate collar 66 can freely be shifted rearwardly for securing the front collar 66 by the clevis pin 63 to any of the mounting holes 62 of the positioning bar 60. Thereafter the hydraulic actuator is retracted to lower the pick-up frame 50 and to load again the flotation and the cushioning springs 65, 68.

This flotation system allows a close positioning of the pick-up tines 55 to the ground, which is very advantageous in crops having no substantially high stubble such as hay. However, when baling other crops, such as straw, this close positioning is not required and the pick-up assembly 14 may be travelled at a higher level above the ground, while the guide wheels 58 no longer have to be in permanent engagement with the ground. This condition is illustrated in FIG. 3. Here the clevis pin 63 has been removed from the front portion of the positioning bar 60 and has been inserted through the intermediate collar 66 in a more rearward mounting hole 79 of this bar 60. The flotation spring 65 is no longer loaded and the weight of the pick-up assembly 14 is now transferred via the positioning bar 60 and the collar 66 upon the cushioning spring 68. Because of its high spring constant this spring 68 is hardly compressed, such that the choice of the mounting hole 79 for the clevis pin 63 substantially determines the height of the pick-up assembly 14. The use of this cushioning spring 68 is advantageous in that it dampens the shocks from the positioning bar 60 on the beam 61 and hence on the main frame 11. Such shocks occur when the baler 10 is travelled over rough ground which induces a rocking movement to the pick-up assembly 14.

To vary the pick-up between a flotation condition as shown in FIG. 2 and a fixed height condition as shown in FIG. 3, or vice versa, the hydraulic actuator 72 is extended such that the pressure on the springs 65, 68 is released. The clevis pin 63 can be removed to shift these springs and their intermediate collar 66 along the bar 60. The pin 63 can now be reinserted in one of the mounting holes 62, 79 as required, whereafter the hydraulic actuator 72 is retracted to load again the cushioning spring 68 or the springs 65, 68.

While the preferred structure in which the principles of the present invention have been incorporated is shown and described above, it is to be understood that the invention is not to be limited to the particular details, as shown and described above, but that, in fact, widely different means may be employed in the practice of the broader aspects of the invention.

For example, it is conceivable to provide a pick-up positioning system wherein the rear end of the positioning bar 60 is pivotably affixed to a beam of the main frame 20, while its front end is slidably received in a member of the pick-up frame 50. A flotation spring then may be mounted for compression between the pick-up frame 50 and a pin which is mounted in a hole in the rear portion of the bar. It is also conceivable to use springs which are not mounted over the positioning rod 60, but which extend parallel thereto and are engaged by an abutment means mounted onto this rod. The cushioning spring 68 may also be replaced with another buffer means, such as a rubber socket. The pick-up positioning means of the invention may also be used in other crop-collecting machinery, such as rectangular balers or loader wagons.

The wrapping apparatus 16 for wrapping material around a completed bale will now be described in further detail with reference to FIG. 4, which shows this apparatus 16 while dispensing net 17 to the cylindrical package 13 rotated in the bale forming chamber 12.

The wrapping apparatus 16 comprises a net supply assembly 83, a dispensing mechanism 84 for receiving wrapping material from the supply assembly 83 and dispensing it to the bale forming chamber 12 and a severing assembly 85 for severing the wrapping material after it has been wound around the completed cylindrical package 13.

The net supply assembly 16 comprises a support shaft 87 which is mounted for rotation in apertures in the front portion of the side walls 22. A supply roll of wrapping material 88, such as net, is mounted onto this shaft 87 and secured thereto by appropriate means such as a barbs projecting from the shaft 87 or a pair of cones secured thereto and inserted into the core of the supply roll 88. The net 17 is guided along an idler roll 89 to the dispensing mechanism 84.

This mechanism 84 comprises a pair of parallel frame members 92 fixedly secured to a rotatably supported cross tube 93 which extends between the side walls 22, and an upper and a lower clamping member 94, 95, both of which have tips for grasping the net 17 in a fashion which is clearly described in U.S. Pat. No. 4,956,968. Two spreader rolls 96, 97, provided with appropriate surface elements, such as spirals, for spreading the side strips of the dispensed net 17, extend between the frame members 92. The net 17 issued from the supply roll 88 is guided from the idler roll 89 along a path around the spreader rolls 96, 97 to the clamping members 94, 95.

Mounted outboard of the side wall 22 is an electrical actuator assembly 98 comprising means for reciprocally driving an element 99 which is pivotally attached to one end of a link member 100. The other end of this link member 100 is fixedly secured to an outboard end of the cross tube 93.

Extension and retraction of the actuator element 99 pivot the frame members 92 rearwardly and forwardly to deliver the net 17 to a gap between the exit of the apron assembly 28 and the stripper roll 43.

The net severing assembly 85 comprises a shear bar 103 fixedly mounted between the side walls 22 and a transverse knife 104 affixed to a mounting member 105 extending between a pair of parallel knife support arms 106 which are rotatably mounted at fixed pivot points 107 on the inside of the side walls 22. A coupling link 110 is pivotally attached at its upper end to one of the frame members 92. Its lower end is received in a sliding bushing 111 which is pivotally attached to one of the knife support arms 106. The lower portion of the coupling link 110 is provided with a stop nut 112 for adjusting the position of the knife 104 to the shear bar 103 when the frame members 92 are pivoted to their uppermost position, slightly above the position shown in FIGS. 4 and 5.

The wrapping apparatus 16 further comprises a drag control mechanism 114 for maintaining the net 17 stretched between the net supply assembly 83 and the bale forming chamber 12. This control mechanism 114 comprises a steel friction disc 115 which is secured to the outer end of the shaft 87 of the net supply assembly 83. The periphery of this disc 115 is engaged by a brake shoe 116 provided with a lining of friction material and affixed to a drag lever 117 which is pivotally attached to the side wall 22. The upper arm of the lever 117 is pushed forwardly by a member 118 of a load arm 119. Both the lever 117 and the load arm 119 are pivoted about a stud 120 which is welded onto the side wall 22.

The periphery of the net supply roll 88 is engaged by a transverse sensor member 121 at the end of an forwardly and upwardly extending sensor arm 122. This arm 122 is attached to the inner end of a pivot shaft 123 extending through the side wall 22. A pull arm 124 is fixedly attached to the outer end of the shaft 123. A tension spring 126 is mounted between the pull arm 124 and an extension 127 of the load arm 119 for forcing the brake shoe 116 onto the friction disc 115.

A rod 129 is pivotally attached to the upper end of the pull arm 124. The upper end of this rod 129 is slidingly received in a hole of a pivot 130 which is attached to the upper portion of the side wall 22. A compression spring 131 is mounted over the rod 129 and compressed between the pivot 130 and a pair of locking nuts 132 which are screwed on the rod 129. The position of the nuts 132 on the nuts may be changed to vary the compression the spring 131 and hence the force on the upper end of the pull arm 124.

Affixed to the load arm 119 is a release rod 135 whereof the rear end is mounted in a sliding yoke 136 which is pivotably attached to a release arm 137 affixed to the cross tube 93. Rotation of this tube in counter-clockwise direction as seen in FIG. 4 slides the yoke 136 over the rod 135 until it engages a stop member 138 near the end of the rod 135 and pulls this rod and the load arm 119 rearwardly. The member 118 of this arm 119 is released from the drag lever 117, such that the force of the tension spring 126 is cancelled, but the lever 117 remains biased towards the friction disc 115 by a bias spring 141.

The brake shoe 116 can be lifted to release the friction disc 115 completely by pushing a lever 143 rearwardly such that a stud 144 welded to this lever 143 pushes the drag lever 117 and the load arm rearwardly and engages a notch in the lever 117. This release operation is required when the baler 10 runs out of wrapping material and the supply roll 88 has to be replaced.

Figure 4:
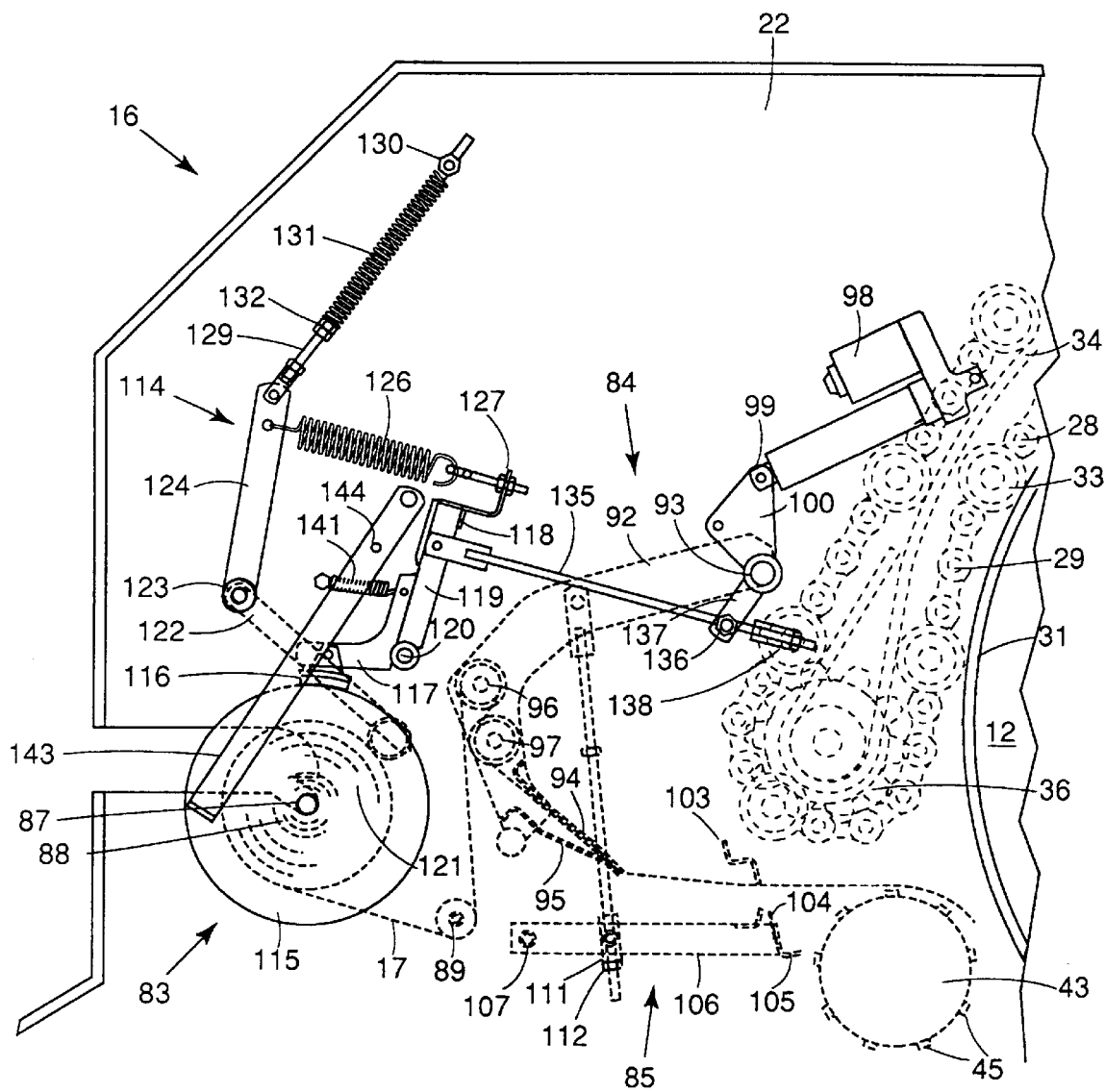
FIGS. 4, 5 and 6 are side elevations views of the wrapping apparatus of the baler of FIG. 1 in selected conditions during operation.

FIG. 4 illustrates the operation of the wrapping apparatus 16 when about half of the wrapping material available on a roll has been dispensed. The net 17 is unwound from the supply roll 88 and is guided along the idler roll 89, the spreader rolls 96, 97 and the clamping members 94, 95 to the bale forming chamber 12 where it has been grasped by the rotating cylindrical package 13. During this stage the actuator 98 has not been fully retracted such that the support arm 106 of the net severing assembly 85 has not reached its uppermost position and there remains a gap between the shear bar 103 and the knife 104 for feeding the net 17 between.

On the one hand it is required that the net surface is pulled with sufficient force against the spreader rolls 96, 97 for effective spreading of the material unrolled from the supply roll 88, and on the other hand this force has to be limited to prevent shearing of this material. As the resistance against unwinding grows as the supply roll diameter diminishes and the roll 88 is rotated more rapidly, the drag force exerted by the brake shoe 116 has to be adapted to accordingly. This effect is generated by the drag control mechanism 114.

The diameter of the supply roll 88 is sensed by the sensor arm 122, which is forced against the roll surface by the tension spring 126. A portion of this spring force is compensated by the force of the compression spring 131 which pushes the pull arm 124 forwardly, such that the sensor arm member 121 has no significant braking effect on the roll 88. The roll diameter defines the position of the pull arm 124 and hence the extension of the tension spring 126. The force from this spring is transferred upon load arm 119 and therefrom upon the drag lever 117 which pushes the brake shoe 116 against the friction disc 115.

A full supply roll 88 will generate maximum spring extension and hence maximum braking force for the rotation of the roll shaft 87. While the roll diameter decreases gradually during wrapping operations, the spring 126 contracts accordingly and the braking force on the periphery of the friction disc 115 decreases proportionally. Thus are provided means for maintaining the net 17 stretched with a substantially constant force during all wrapping operations.

Figure 5:
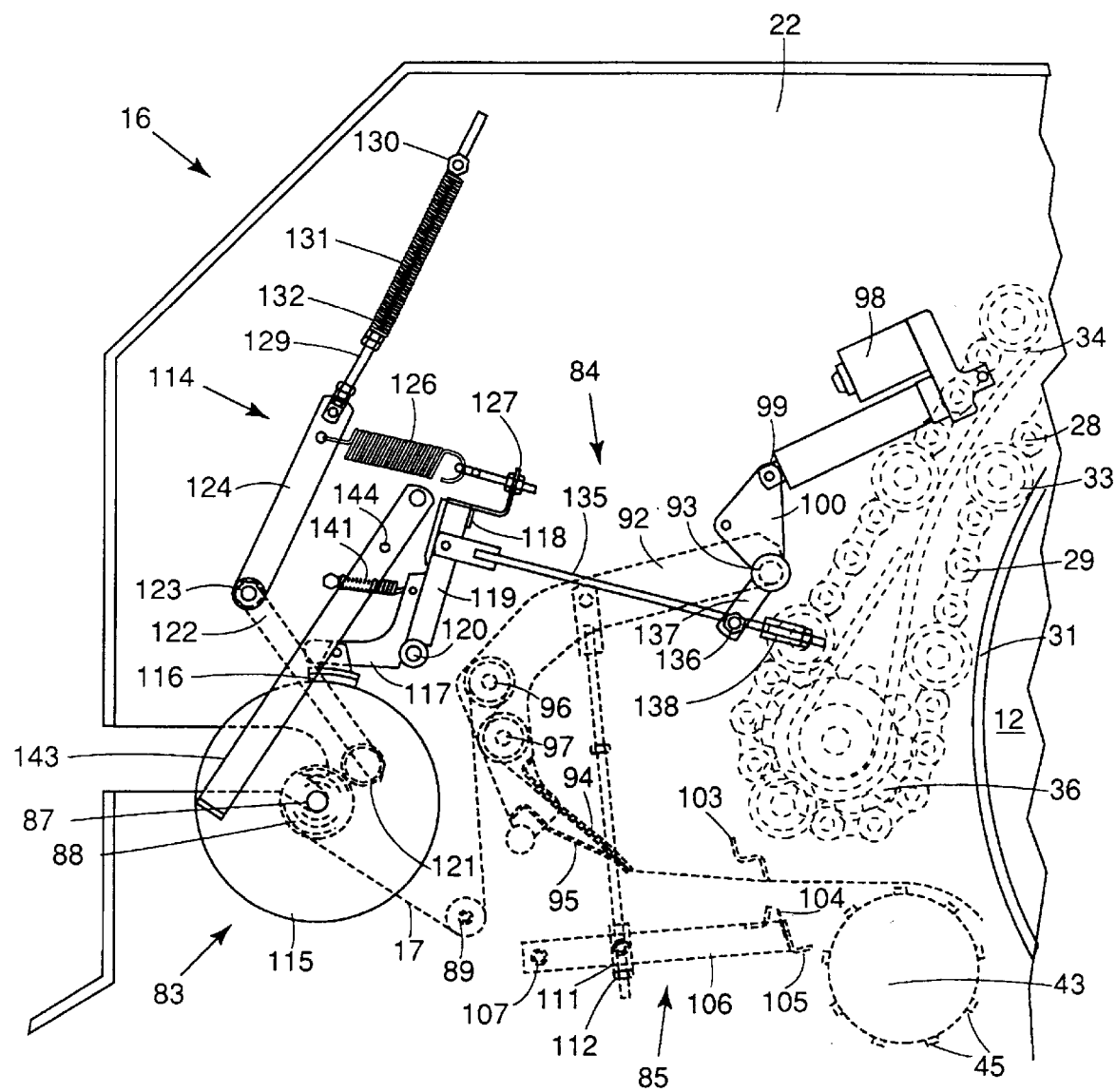

When the roll 88 is almost completely unwound, as shown in FIG. 5, the load arm 124 has reached its rearmost position and is now extending towards the pivot 130 of the compression spring 131. Its spring forces are assumed completely by the pivot 130 and the load arm shaft 123, such that they have no further effect on the roll-engaging member 121 of the sensor arm 122. The only force for holding this member 121 against the roll surface results from the tension spring 126 which has retracted in accordance the roll diameter. Hence the effect of the decreasing spring forces of the tension spring 126 on the roll surface is compensated by an equally decreasing spring forces of the compression spring 131.

Figure 6:
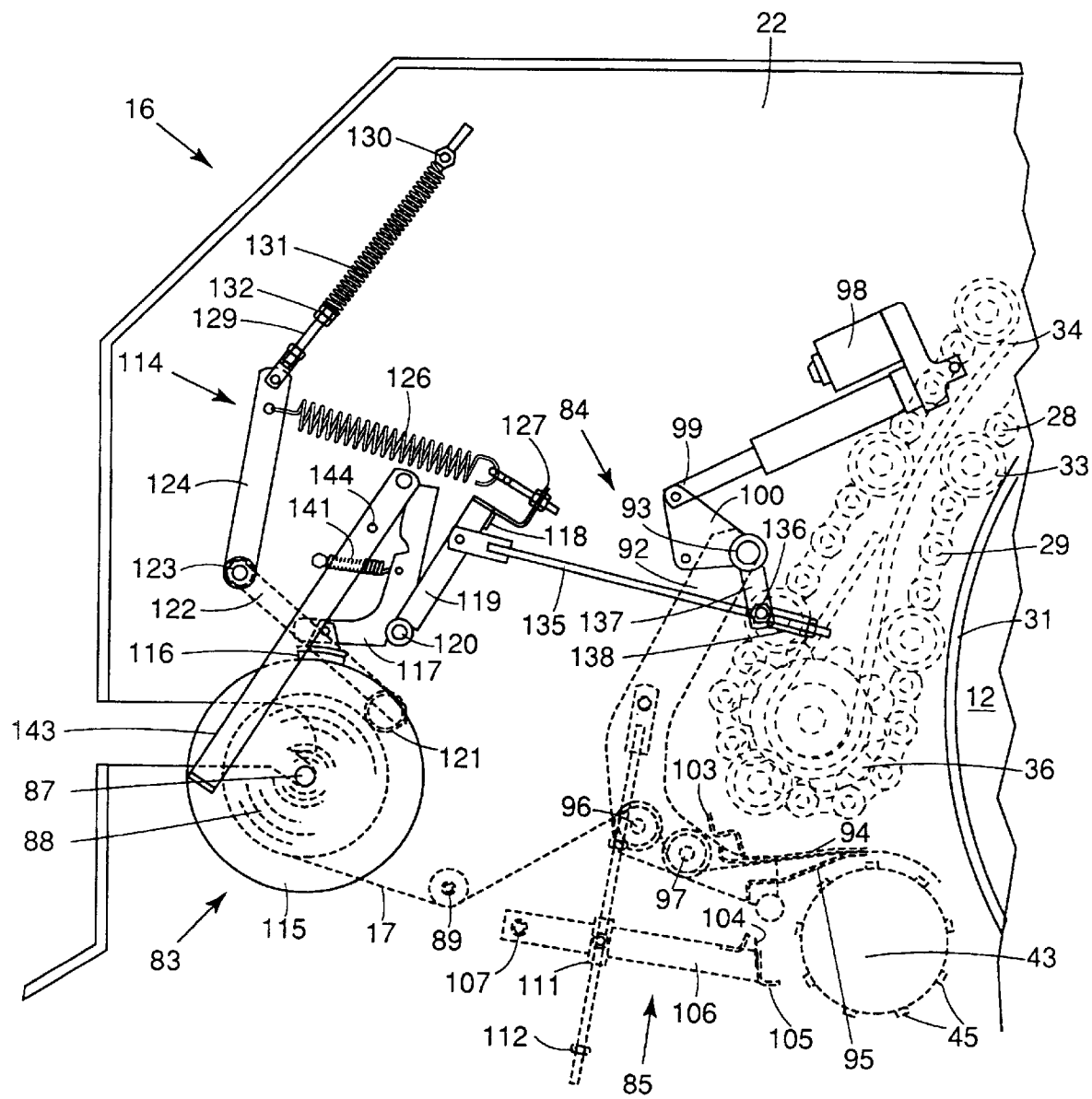

FIG. 6 illustrates the wrapping apparatus 17 at the start of a wrapping operation. Between wrapping operations the net dispensing mechanism 84 is retracted in a position slightly above the position shown in FIGS. 4 and 5. The net 17 has been severed by the severing assembly 85 and a net tail is extending between the clamping members 95, 96 and the knife 104 while a compacted cylindrical package is being formed in the chamber 12. At the start of a new wrapping operation the actuator 98 is energized to pivot the frame members 92 rearwardly and to lower the knife support arms 106. The net tail is released from the knife 104 and conveyed by the clamping members 94, 95 into the gap between the still rotating apron assembly 28 and stripper roll 43. The ribs 45 on the stripper roll 43 grasp the end of the net 17 and feed it to the nip between this roll 43 and the surface of the cylindrical package of crop material. The net 17 is further unwound from the supply roll 88 by the action of the still rotating roll 43 and package.

During the rearward movement of the frame members 92 the sliding yoke 136 on the release arm 137 engages the stop member 138 and pulls the release rod 135 and the load arm 119 rearwardly, as described above. The arm 119 disengages the drag lever 117, such that this lever is biased towards the friction disc 115 by the bias spring 141 only. The residual drag force effected by the brake shoe 116 on the one hand is great enough for providing some drag required for spreading the net 17 by means of the spreader rolls 96, 97 and on the other hand is small enough to prevent extraction of the net tail from between the clamping members 95, 96 during the rearward movement of the net dispensing mechanism 84. Omission of the bias spring 141 would allow a substantial transverse contraction of the net, such that the first winding around the cylindrical package 13 would not sufficiently cover the side portions of its circumferential surface and additional windings of wrapping material would be required to obtain a solid and stable bale.

After feeding the net tail to the stripper roll 43, the net dispensing mechanism 84 returns to its position shown in FIGS. 4 and 5. The release arm 137 is pivoted forwardly and the yoke 136 disengages the release rod 135, such that the tension spring 126 can pull the load arm 119 against the drag lever 117 and provide full pressure upon the brake shoe 116. The drag forces on the net 17 increase accordingly such that the spreader rolls 96, 97 may spread the net effectively over the full width of the bale forming chamber 12 during the remainder of the wrapping operation.

While the preferred structure in which the principles of the present invention have been incorporated is shown and described above, it is to be understood that the invention is not to be limited to the particular details, as shown and described above, but that, in fact, widely different means may be employed in the practice of the broader aspects of the invention. For example, it is conceivable to provide the supply roll shaft 88 with a flat friction disk and brake shoes engaging the side surfaces of this disk. The drag control mechanism 114 of the invention may also be combined with other types of net dispensing mechanisms, which e.g. may comprise a pair of feed rolls instead of a pair of clamping members 94, 95 attached to a pair of movable members 92.

It will be appreciated that thus is provided a wrapping apparatus with a drag control mechanism, which, on the one hand is not dependent on the type of net or other wrapping material which is dispensed, and on the other is operable to apply a substantially constant drag force upon the supplied wrapping material, irrespective of the quantity of material available on the supply roll.

What is claimed is:

1. A baler for forming crop material into cylindrical bales, said baler comprising a main frame and a baling chamber mounted on said main frame for forming cylindrical packages of crop material therein;

said baling chamber being at least partially defined by a pair of side walls and an apron assembly having an inner run which is guided at the inside of a cylindrically shaped continuous wall, and an outer run which is guided at the outside of said continuous wall; and said continuous wall further comprising an opening for the recuperation into said chamber of crop material which has been entrained by said apron assembly when the latter left said baling chamber and entered its outer run wherein said opening extends over substantially the full width of the baling chamber wherein said apron assembly further comprises a pair of parallel support chains interconnected by equidistant slats; and said opening further comprises a circumferential length which is substantially equal to the distance between two consequent slats.

2. The baler according to claim 1, wherein the inner run of said apron assembly is guided along a fixed path adjacent the inside of said continuous wall.

3. The baler according to claim 2, wherein the outer run of said apron assembly is guided along a fixed path adjacent the outside of said continuous wall.

4. The baler according to claim 3, wherein said opening further comprises a wall section in the upper half of said baling chamber.

5. The baler according to claim 4, wherein the baling chamber further comprises a front section which is affixed to said main frame and a rear section which is pivotally affixed to said front section, wherein said opening is provided in the front section where the apron assembly leaves said baling chamber.

* * * * *